(12) United States Patent
Yu (10) Patent No.: US 11,081,876 B2
(45) Date of Patent: Aug. 3, 2021

(54) CONTROL CIRCUIT FOR AN INPUT FILTER CAPACITOR IN A SWITCH-MODE POWER SUPPLY

(71) Applicant: Renesas Electronics America Inc., Milpitas, CA (US)

(72) Inventor: Zhihong Yu, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 3 days.

(21) Appl. No.: 16/742,703

(22) Filed: Jan. 14, 2020

(65) Prior Publication Data

US 2020/0328590 A1 Oct. 15, 2020

Related U.S. Application Data

(60) Provisional application No. 62/831,574, filed on Apr. 9, 2019.

(51) Int. Cl.
| | |
|---|---|
| *H02H 7/125* | (2006.01) |
| *H02M 1/32* | (2007.01) |
| *H02M 7/04* | (2006.01) |
| *H02H 7/16* | (2006.01) |
| *H02M 3/335* | (2006.01) |
| *H02M 7/06* | (2006.01) |

(52) U.S. Cl.
CPC ............ *H02H 7/1252* (2013.01); *H02H 7/16* (2013.01); *H02M 1/32* (2013.01); *H02M 3/33569* (2013.01); *H02M 7/04* (2013.01); *H02M 3/33507* (2013.01); *H02M 7/062* (2013.01)

(58) Field of Classification Search
CPC ......... H02H 7/1252; H02H 7/16; H02M 1/15; H02M 1/32; H02M 3/335; H02M 3/33507; H02M 3/33569; H02M 7/04; H02M 7/062
See application file for complete search history.

(56) References Cited

U.S. PATENT DOCUMENTS

| | | | | |
|---|---|---|---|---|
| 8,848,321 | B2 * | 9/2014 | Halberstadt | H02M 3/155 361/18 |
| 9,179,523 | B1 * | 11/2015 | Ryu | H05B 45/37 |
| 9,837,917 | B1 * | 12/2017 | Furtner | H02M 3/33523 |
| 2010/0027299 | A1 * | 2/2010 | Fang | H02M 3/33507 363/21.15 |
| 2013/0063990 | A1 * | 3/2013 | Yang | H02M 3/33523 363/55 |
| 2013/0343095 | A1 * | 12/2013 | Zhu | H02M 1/4258 363/21.01 |

* cited by examiner

*Primary Examiner* — Thienvu V Tran
*Assistant Examiner* — Shahzeb K Ahmad
(74) *Attorney, Agent, or Firm* — Foley & Lardner LLP (57) ABSTRACT

One or more embodiments relate to a control circuit for an input filter circuit in a switch mode power supply comprising a power switch and a switch controller to control the power switch to provide a regulated output voltage and current to a load. The control circuit, also referred to as a filter control circuit, can be used to detect a high voltage surge at its input and disconnect a capacitor in the input filter circuit from an input return, thereby protecting the input filter capacitor and the SMPS from damage. According to certain aspects, the control circuit can be integrated with the switch controller. Additionally, the control circuit can provide power to the switch controller at start-up.

20 Claims, 7 Drawing Sheets

CONTROL CIRCUIT FOR AN INPUT FILTER CAPACITOR IN A SWITCH-MODE POWER SUPPLY

CROSS-REFERENCE TO RELATED PATENT APPLICATIONS

This application claims priority from U.S. Provisional Patent Application No. 62/831,574, filed Apr. 9, 2019, incorporated herein by reference in its entirety.

TECHNICAL FIELD

The present embodiments relate generally to power management, power electronics, and industrial power products.

BACKGROUND

Various types of switch mode power supplies including ac-dc and dc-dc power supplies are widely used in many electronics systems in low voltage and high voltage applications. A commonly used component in a switch mode power supply (SMPS) and especially an ac-dc type of SMPS, is an input filter capacitor which is used to remove the ac component from the rectified AC input voltage. However, since an ac-dc SMPS is typically frequently exposed to a very high voltage in the event of lightning surges, faulty wiring, or power line fluctuations, sometimes the input filter capacitor and even the SMPS as a whole can be easily damaged. One way to protect the SMPS from such a high voltage damage is to use filter capacitors with higher voltage ratings which can withstand higher breakdown voltages. The higher the voltage rating of the filter capacitors, the higher the level of voltage surge the power supply can withstand. Furthermore, the greater the number or capacity of filter capacitors used, the greater energy from the high voltage surge the power supply can withstand. However, filter capacitors with higher voltage ratings are often associated with higher costs and larger board sizes.

Thus, it would be desirable to have a solution that can provide high voltage protection to the input filter capacitors and the power supplies without a considerable increase in their size or cost.

SUMMARY

One of more embodiments relate to a control circuit that can be used to protect an input filter capacitor for an SMPS and the entire SMPS from an overvoltage surge, In various embodiments, the control circuit can include a transistor which can disconnect the input filter capacitor in case of an overvoltage event. A control circuit as such can provide an overvoltage protection to the power supply while also lowering the customer's bill of materials cost and the circuit board size.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Embodiments of the present disclosure relate to an apparatus and a method for a control circuit to protect—in an overvoltage event, for example—an input filter capacitor for an SMPS and the entire SMPS Additionally, the embodiments disclose an apparatus and a method to provide a start-up supply voltage to a switch controller included in the SMPS.

Since flyback converters are widely used for offline ac-dc applications, the disclosed embodiments have been explained with respect to an offline ac-dc flyback type of SMPS, however, those may also be used for other types of SMPSs such as forward, half bridge, full bridge, push-pull, or more.

As stated earlier, SMPSs are widely used in today's electronic systems. They are popular mainly due to their impressive efficiency, light weight, and low volume. The reliability of a power supply greatly determines the lifetime of an electronic system. In the case of personal computers, 90% of failures can be attributed to SMPS-related issues. As such, power supply systems are expected to provide high reliability.

A typical switch mode power supply system has the following key components: an input rectifier, an input filter, power switches, a power transformer, an output rectifier, output filters, and a control circuit.

The input filter in a switching power supply typically has three primary purposes. The first purpose is to prevent electromagnetic interference (EMI) generated by the switching source from reaching the power line and affecting other equipment. The second purpose of the input filter is to supply power for a short period when the AC input is near its lowest value in a sine wave, or momentarily shut off, and when the input response cannot keep up with the dynamics of the main transistor switching. The third purpose is to smooth the rectified AC voltage for optimal input voltage range of the power transformer, and to limit certain level of over-voltage from the power line to reach other sensitive circuitry with the help of other devices—like MOV (metal-oxide varistor) as 138. However, the conventional input filter circuits include capacitors which can be easily damaged by high voltage surges that exceed their voltage ratings. As will be described, according to certain aspects the embodiments of a filter control circuit protects a capacitor used in an input filter in an SMPS.

Figure 1:
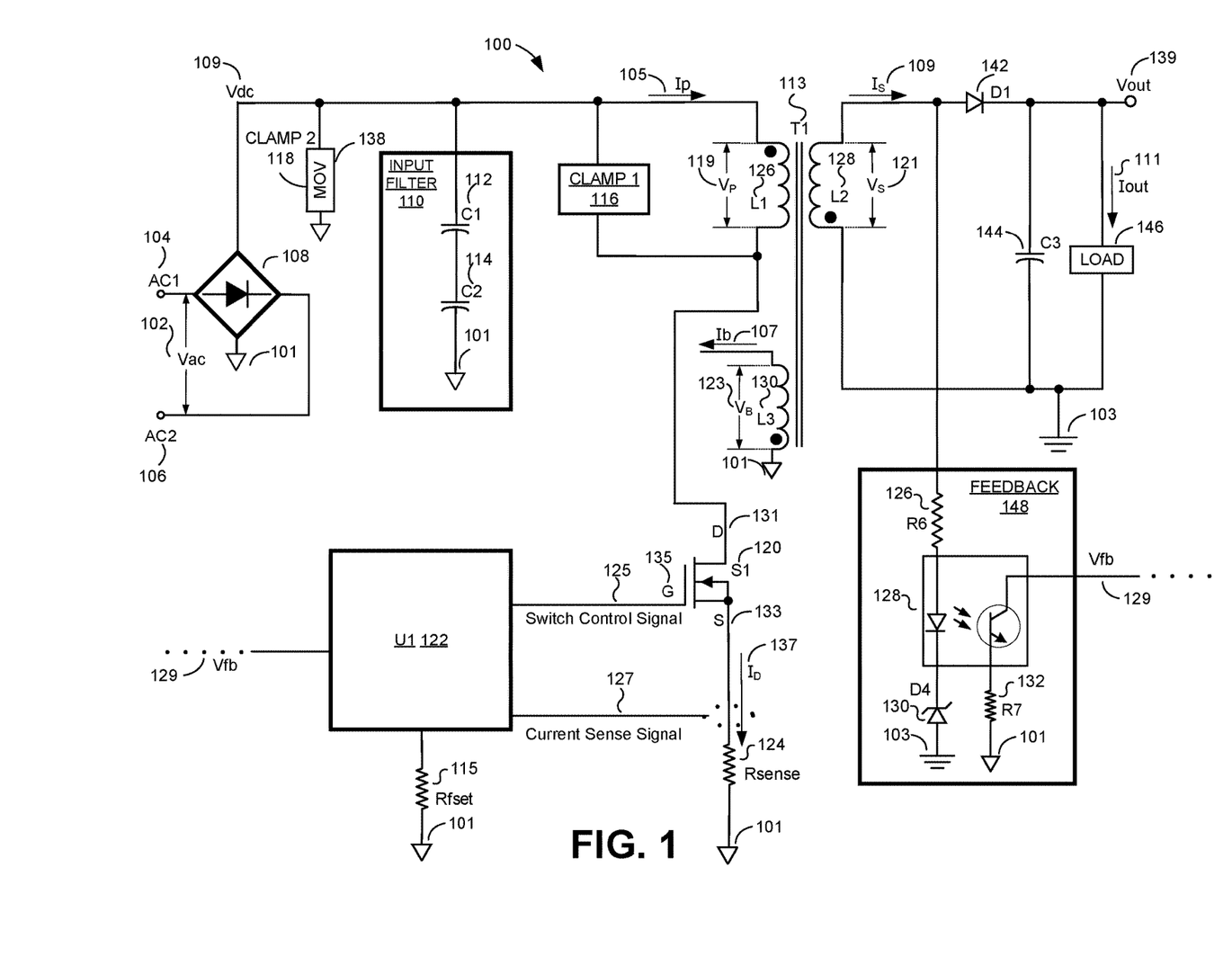
FIG. 1 illustrates a block diagram of an example conventional ac-dc SMPS 100 including a conventional filter circuit and a switch controller.

FIG. 1 illustrates a block diagram of an example ac-dc SMPS 100. The example SMPS 100 is a flyback type of SMPS. The SMPS 100 is coupled to receive an ac voltage Vac 102 via the input terminals ac1 104, ac2 106; and generate an output voltage Vout 139 and an output current I out 111 to a load 146. The primary side of the power supply 100 is referenced to an input return 101 and secondary side of the supply 100 is referenced to ground 103. The primary side may also be referred to as an input side and the secondary side may be referred to as an output side. The power supply 100 is shown to include an energy transfer element, also referred to as a transformer T1 113, including a first primary side inductor L1 126, also referred to as a primary winding or input winding; a second primary side inductor L3 130, also referred to as an auxiliary winding or a bias winding; and a secondary side inductor L2 128, also referred to as a secondary winding or an output winding.

Also shown in FIG. 1 are an input rectifier circuit 108, an input filter circuit 110, a first voltage clamp circuit 116, a second voltage clamp circuit 118, a power switch S1 120 having a drain terminal 131, a source terminal 133, and a gate terminal 135; a switch controller U1 122, a current sense resistor Rsense 124, an optional switching frequency programming resistor Rfset 115, an output rectifier diode D1 142, an output filter capacitor C3 144, and a feedback circuit 148. The current sense resistor Rsense 124 may be integrated within the power switch S1 120. The second voltage clamp circuit 118 can be before or after the rectifier 108 and typically includes a metal-oxide varistor MOV 138.

FIG. 1 also illustrates voltages, currents, and signals including a rectified dc voltage Vdc 109, a primary voltage Vp 119 at the primary winding L1 126, a secondary voltage Vs 121 at the secondary winding L2 128, a bias voltage 123 at the bias winding L3 130, a primary current Ip 105, a secondary current Is 109, a bias current Ib 107, and a switch current Id 137, a feedback voltage signal Vfb 129, a switch control signal 125, and a current sense (CS) signal 127.

The power switch S1 120 may also be referred to as a primary switch since it is coupled to the primary winding or the coupled inductor L1 126. More specifically, the drain terminal D 131 of the power switch S1 120 is coupled to the primary winding L1 126 and the source terminal S 133 of primary winding L1 126 is coupled to the input return 101 via the current sense resistor Rsense 124.

In the SMPS 100, initially, the ac input voltage Vac 102 is rectified by the input rectifier circuit 108. It may be appreciated by those skilled in the art, that the ac input voltage Vac 102 can be approximately 85V to 265 VAC for a single phase configuration or approximately 240 VAC/380 VAC/480 VAC for a three phase configuration. The input rectifier circuit 108 may be a standard bridge rectifier commonly used in the art for ac to dc rectification. It may be noted that the voltage Vdc 109 is positive with respect to the input return 101 and the output voltage Vout 139 is positive with respect to the output return 103. The input filter circuit 110 coupled between the Vdc 109 and the input return 101, and is a conventional capacitive filter circuit which is shown to include capacitors C1 112 and C2 114.

It may be appreciated by those of ordinary skill in the art that during normal operation of the SMPS 100, the controller U1 122 generates the switch control signal 125 to turn the power switch S1 120 on or off. As is well known in the art, the normal operation may include a continuous mode, a discontinuous mode, or a quasi-resonant mode of operation, etc. The power switch S1 120 opens and closes in response to receiving the switch control signal 125 at its gate terminal G 135 from the controller U1 122. The power switch S1 120 is closed when it is on and is open when it is off. During the time when S1 120 is on, the inductor L1 126 gets charged to store energy and the primary voltage Vp 119 is generated across L1 126. When S1 120 is turned off, the stored energy in the L1 126 is transferred to secondary side through inductor L2 128, which is coupled to the inductor L1 126. As a result of this energy transfer, a secondary voltage Vs 121 is generated across the inductor L2 128 which is further rectified by the output rectifier diode D1 142, filtered by the output filter capacitor 144, and appears at the load 146 as the output voltage Vout 139 and the output current Iout 111.

In one example, the switch controller U1 122 controls the switching of the power switch S1 120 via the switch control signal 125 in response to the current sense signal 127 and the feedback voltage signal Vfb 129.

More specifically, the resistor Rsense 124, can be used to sense a current in the switch 120 and generate the current sense signal 127 which is received by the switch controller U1 122. As stated before the switch controller U1 122 controls the switching frequency of the switch S1 120, in response to the current sense signal 127. The value of resistor Rfset 115 as well can further help set a switching frequency of the switch S1 120.

The clamp circuit 116 is coupled across the primary winding L1 126. Not all of the energy stored by the primary current Ip 105 through L1 126 can be transferred to other windings because of imperfect magnetic coupling between them. In case of L1 126, the energy that cannot be transferred to other windings is received by the clamp circuit 116 coupled across the primary winding L1 126. The clamp circuit 116 limits the voltage across primary winding L1 126 to protect the power switch S1 136 from damage by excessive voltage. The clamp circuits 116 can be any voltage clamp circuits available in the existing art.

It may also be appreciated that there is also a bias voltage Vb 123 generated across the bias winding L3 130 due to its magnetic coupling with the primary winding L1 126. Further, the SMPS 100 the diode D1 142 as an output rectifier and a capacitor C3 144 as an output filter, both of which may help remove an ac component in the output voltage Vout 139.

The feedback circuit 148 which in one embodiment is coupled to sense the output voltage Vout 139 via a resistor R6 126, an optocoupler 128, a resistor R7 132, and a zener diode D4 130; and generate the feedback voltage signal Vfb 129. The switch controller U1 122 is coupled to receive the feedback voltage signal Vfb 129 at the terminal FB 129. In one example, the switch controller U1 122 is configured to control the switching frequency of the switch S1 120 also in response to the feedback voltage signal Vfb 129. It may be appreciated that the switch controller U1 122, may be configured to predefine values for the Vfb 129 signal such as a reference voltage Vref, a feedback high threshold value Vfb_high and a feedback low threshold value Vfb_low against which the Vfb 129 may be compared when the SMPS 100 is operating. In a typical implementation if the value of Vfb 129 is between Vfb_low and Vfb_high, then the SMPS may be considered to be operating in a normal mode. If anytime the Vfb 129 is lower than the Vfb_low then the power switch S1 120 may be off or run in a burst mode or reduced frequency mode. After the power switch S1 is turned off, the Vfb 129 may also be compared with Vref to start normal operation again. Additionally, if anytime the Vfb 129 is higher than the Vfb_high then the SMPS may enter an overload protection mode. There can be several other implementations of this in the prior art.

In various examples, the power switch S1 120 may be a metal oxide semiconductor field effect transistor (MOSFET) or a bipolar junction transistor (BJT) or an insulated gate bipolar transistor (IGBT) or any other suitable switch. In one example, switch controller U1 122 is implemented as a single integrated circuit (IC). Although the power switch S1 120 is shown separate from the switch controller U1 122, in some examples, they both can be integrated as a single IC.

Referring back to the input filter circuit 110, in some examples of conventional filter circuits, the capacitors C1 112 and C2 114 can be electrolytic capacitors that normally may have a voltage rating of 400V or 450V each. As such, the total rated breakdown voltage may be substantially equal to the sum of the two voltages 800V or 900V. In conventional filter circuits, more capacitors of different voltage ratings can be connected in series to form a string of capacitors to make the SMPS withstand high breakdown voltages. As a different example, three 200V rated capacitors can be connected in series to get a total of 600V breakdown voltage. For applications like power meters, outdoor power, three phase power, or for user locations where the electric grid is unstable, or for high voltage battery or DC bus inputs like electric vehicles or servers, it is very typical to connect at least two capacitors in series like C1 112 and C2 114 to withstand a high breakdown voltage. On the other hand, for indoor applications like chargers or adaptors, usually manufacturers only place one such capacitor as input filter.

Figure 2:
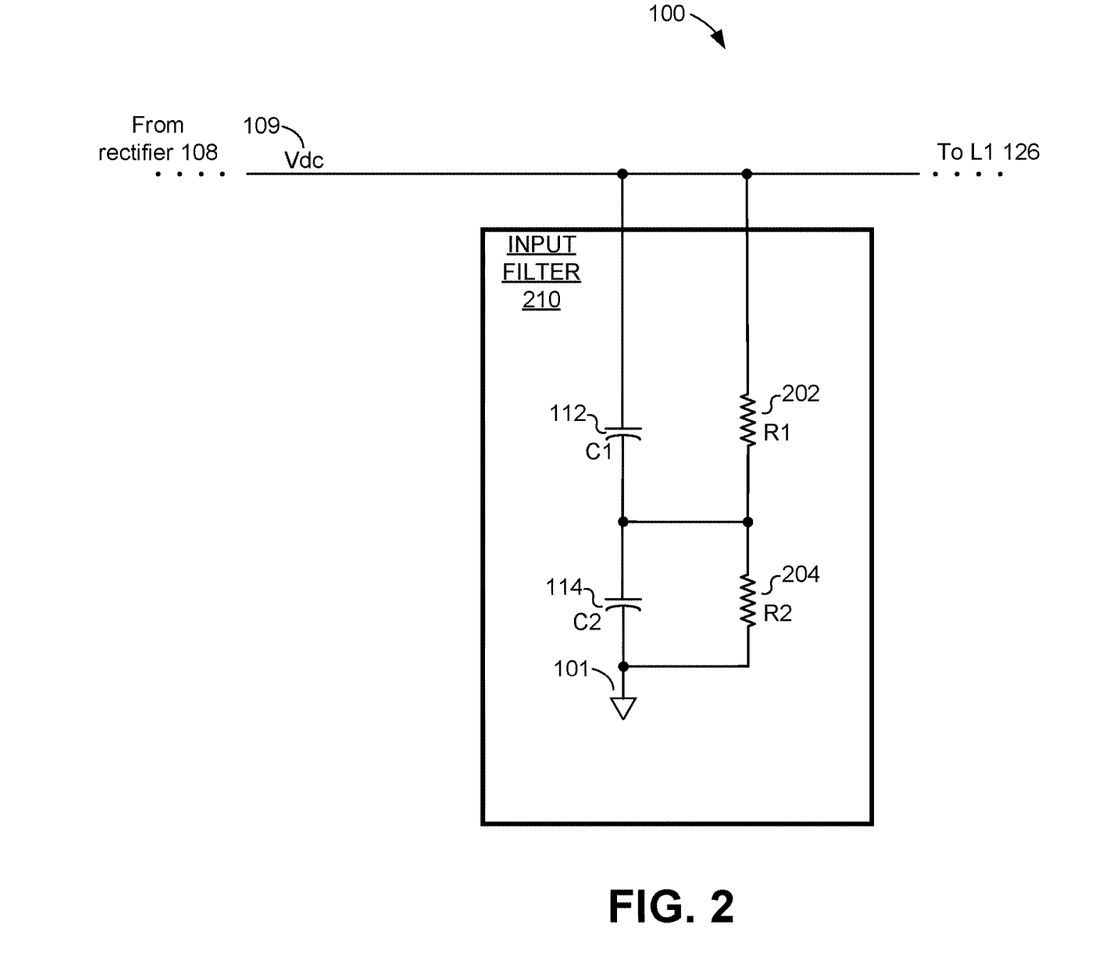
FIG. 2 is a partial diagram illustrating the SMPS 100 including another conventional filter circuit typically used with the SMPS 100 of FIG. 1.

FIG. 2 is a partial diagram illustrating the SMPS 100 including another example of a conventional filter circuit 210 typically used with the conventional SMPS 100 of FIG. 1. The filter circuit 110 includes capacitors C1 112 and C2 114 similarly as shown in FIG. 1. Additionally, resistors R1 202 and R2 204 coupled in parallel with the capacitors C1 112 and C2 114, respectively, to equalize voltage across each capacitor due to manufacturers' tolerance ratings in making the capacitors.

As may be appreciated, if more capacitors are to be added to the filter circuit 210 in series, then more resistors also need to be added. At times there can be an imbalance caused due to mismatching of the capacitor impedances due to manufacturing tolerances. This imbalance can cause heat. The resistors R1 202 and R2 204 are usually bulky surface mount or through hole types to dissipate the heat caused by caused by such an imbalance, which also add to total BOM cost.

It may be appreciated that in such conventional input filters, the total breakdown ratings of these capacitors must be higher than the highest possible Vdc 109 value. Since Vdc 109 is directly rectified from the Vac 102, any lightning voltage or other type of surge at the ac input or disturbance/fluctuation on the power line may cause a sudden increase in the rectified dc voltage Vdc 109. If this sudden increase in the rectified dc voltage is higher than the total breakdown voltage ratings of the filter capacitors, then that may cause a potential failure of the filter capacitors and even the SMPS system.

As explained with respect to FIG. 1 and FIG. 2, the conventional capacitive input filter circuits used with ac-dc power supplies are prone to a high voltage damage depending on their size and rating. Furthermore, in order to make them sustain high voltage surges, their breakdown voltage rating needs to be higher which also leads to their increasing sizes. To summarize, the conventional capacitive input filter circuits which can also sustain high breakdown voltages are neither cost nor size efficient.

Thus, it would be useful to have a solution to protect the input filter capacitors used in a power supply from high voltage surges and to avoid any damage to the capacitors. As when such capacitors fail, they usually overheat and may cause fire and other unwanted consequences, hence protecting the capacitors also means protecting the entire power supply.

As will be explained in the following paragraphs, the present embodiments disclose a control circuit which can be used to protect a capacitor used in an input filter circuit in of an example ac-dc power supply. The control circuit can be used to replace one or more capacitors in a conventional filter circuit. Additionally, the present the embodiments disclose an example overvoltage protection circuit that is configured to work with the control circuit and initial power up methods of the switch controller IC.

Figure 3:
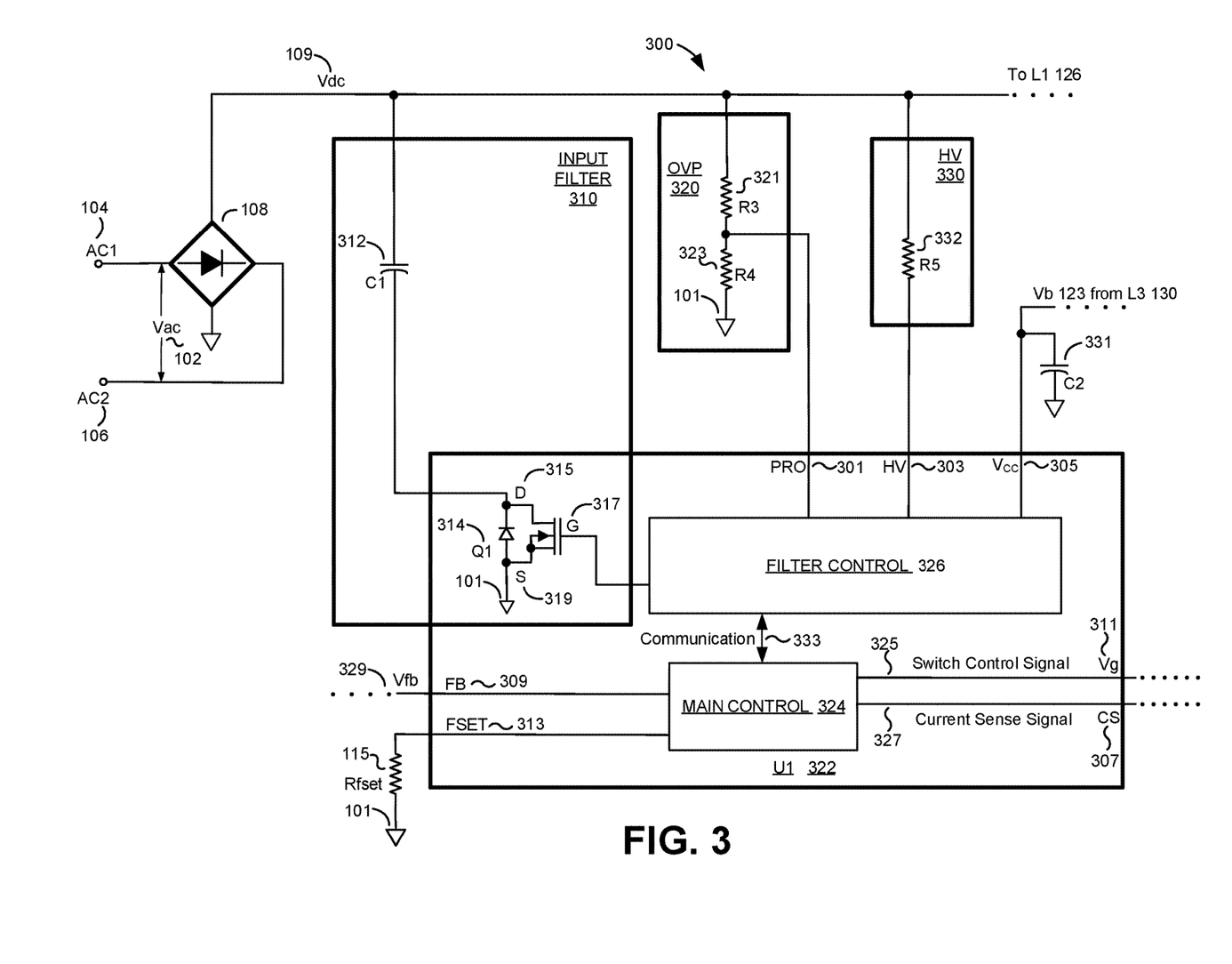
FIG. 3 is a partial diagram of an example SMPS 300 including a filter control circuit, according to a first embodiment of the present disclosure.

FIG. 3 is a partial diagram of an SMPS 300 including a filter control circuit 326, according to a first embodiment of the present disclosure. The SMPS 300 shares many common features, circuit elements, and signals with the SMPS 100 which are configured and coupled to function in a manner as explained with respect to FIG. 1. More specifically, it may be noted that the SMPS 300 includes an input filter circuit 310 coupled in a manner similar to the input filter circuit 110. However, the SMPS 300 and especially the input filter circuit 310 differ from their counterparts in FIG. 1 in a number of ways as explained below.

As shown in FIG. 3, the SMPS 300 includes an OVP circuit 320, a high voltage (HV) start-up circuit 330 in addition to the input filter circuit 310. The switch controller U1 322 includes a main control circuit 324, a filter control circuit 326, and a filter transistor Q1 314. As can be seen, the input filter circuit 310 comprises the capacitor C1 112 having a first terminal which is coupled to the Vdc 109 and a second terminal which is coupled to a drain terminal 315 the filter transistor Q1 314. The filter control circuit 326 is coupled to a control terminal or a gate terminal 317 of the transistor Q1 314. The source terminal 319 of the filter transistor Q1 314 is coupled to the input return 101.

Referring back to FIG. 1, in one embodiment the filter control circuit 326 with the filter transistor Q1 314, together can be used to replace the capacitor C2 114 in the input filter circuit 110. The cost of the transistor Q1 314, in most cases is much lower than C2 114 plus the balancing resistors R1 and R2. Besides, for two capacitors connected in series, the effective value will be only half. As an example, the circuit BOM may only require one 10 uF C1 112 and Q1 314 if using a controller U1 322, and is electrically equivalent to using two 20 uF C1 112 and C2 114, R1 202 and R2 204 if using a different controller, and hence will save quite some cost and BOM. In some examples, the filter control circuit 326 and the filter transistor Q1 314 are integrated with the switch controller U1 122 hence BOM cost is even lower; however, those can also be implemented in a discrete fashion in other embodiments. The filter control circuit 326 can also be implemented in hardware or software or any combination thereof. In other examples, the filter control circuit 326 and the filter transistor Q1 314 may be used to replace a plurality of capacitors included in the input filter circuit or any other type of suitable power supply. Also a plurality of transistors connected in parallel may be used to replace one single Q1 314.

As will be explained further, in one example, the filter control circuit 326 is configured to connect or disconnect the filter capacitor C1 312 via the filter transistor Q1 314 in response to sensing the voltage Vdc 109. More specifically, the filter control circuit 326 is configured to connect the capacitor C1 312 to the input return 101 during a normal (non-overvoltage) operation; and disconnect the capacitor C1 312 from the input return 101 during an overvoltage event. The filter control circuit 326 is coupled to connect and disconnect the capacitor C1 312 by turning on and turning off the transistor Q1 314, respectively.

As can be appreciated, disconnecting the capacitor C1 312 from the input return 101, causes it to be electrically disconnected from the SMPS circuit and as such it can be protected against over-voltage, unless the Vdc 109 becomes higher than the breakdown voltage of C1 312 plus the breakdown voltage of Q1 314. The breakdown voltage of Q1 314 can be conveniently chosen as 500V, 600V, 700V from typical manufacturer spec, which is higher than the breakdown voltage of C2 114 that it is replacing. As such the filter control circuit 326 is configured to block the high voltage surges or prevent those from damaging the filter capacitor C1 312, the switch controller U1 322, and the SMPS 300.

Furthermore, the filter control circuit 326 is configured to sense the Vdc 109 and detect an overvoltage event via the OVP circuit 320. More details about the working of the filter control circuit 326 will be explained with respect to FIG. 5 and FIG. 6.

The main control circuit 324 included in the switch controller U1 322 is configured to control the switching of the power switch S1 120 during a normal mode of operation in the absence of high voltage surges as explained with respect to FIG. 1. The filter control circuit 326 works in parallel to the main control circuit 324 to block the high voltage surges. Furthermore, in order to change from a normal operating mode to an OVP mode or vice versa, the filter control circuit 326 may be coupled to exchange a communication signal 333 with the main control circuit 324.

In various embodiments, the filter transistor Q1 314 may be a MOSFET or BJT or IGBT or any other suitable switch.

In some embodiments, the filter control circuit 326 may be used to control a plurality of transistors to work with or as part of the input filter circuit 310. The switch controller U1 322 is also shown to have terminals PRO 301, HV 303, Vcc 305, Vg 311, CS 307, FSET 313, and FB 309. Also shown is a capacitor C2 331 coupled to the terminal Vcc 305n Vcc which is external to the IC U1 322. The capacitor C2 331 functions as a housekeeping power to keep the Vcc 305 operating.

HV start-up circuit 330 is coupled between the Vdc 109 and the switch controller U1 322 at the terminal HV 303. The OVP circuit 320 is connected to Vdc 109 and is connected to the terminal PRO 301 of U1 322. The OVP circuit 320 in one example, can include resistors R3 321 and R4 323, the values of which can be used to set a threshold voltage for sensing an overvoltage on the Vdc 109. More details about this will be explained later in the specification.

The HV start-up circuit 308 is used to start the U1 322 from the supply of Vdc 109 and can include a resistor R5 332. As mentioned earlier, the switch controller U1 322 can be an integrated circuit which may require a certain supply voltage. In one example, the HV start-up circuit 308 can be used for a fast start-up by providing an initial supply voltage to the IC U1 322. More details about this will be explained later in the specification.

Figure 4:
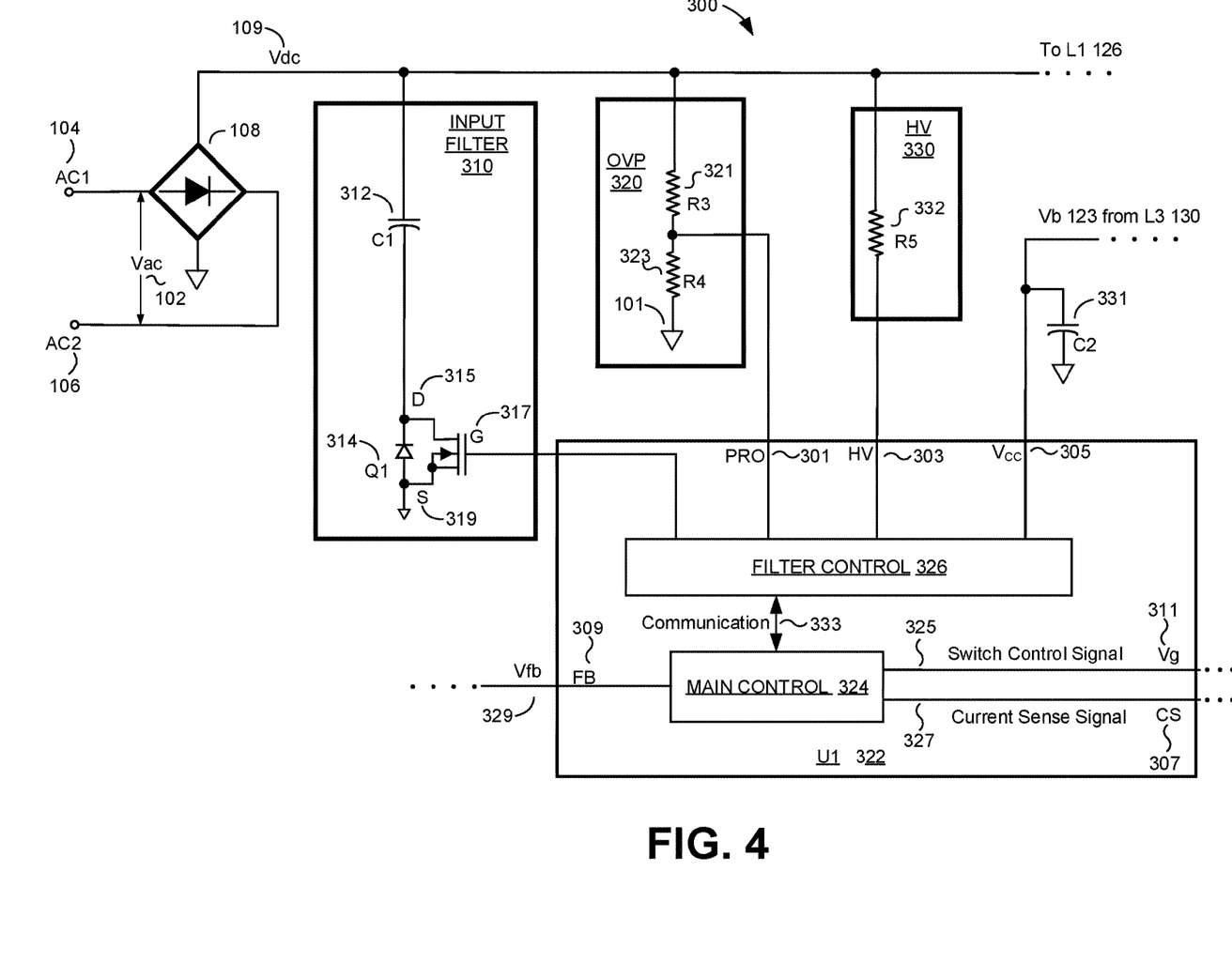
FIG. 4 is a diagram of the example SMPS 300 including a filter control circuit, according to a second embodiment of the present disclosure.

FIG. 4 is a partial diagram illustrating the SMPS 300 including the filter control circuit 326 and the filter transistor Q1 314, according to a second embodiment of the present disclosure. The difference between this and the embodiment of FIG. 3 is that in this embodiment, the filter transistor Q1 314 is external to the switch controller U1 322 and the filter control circuit 326.

Figure 5:
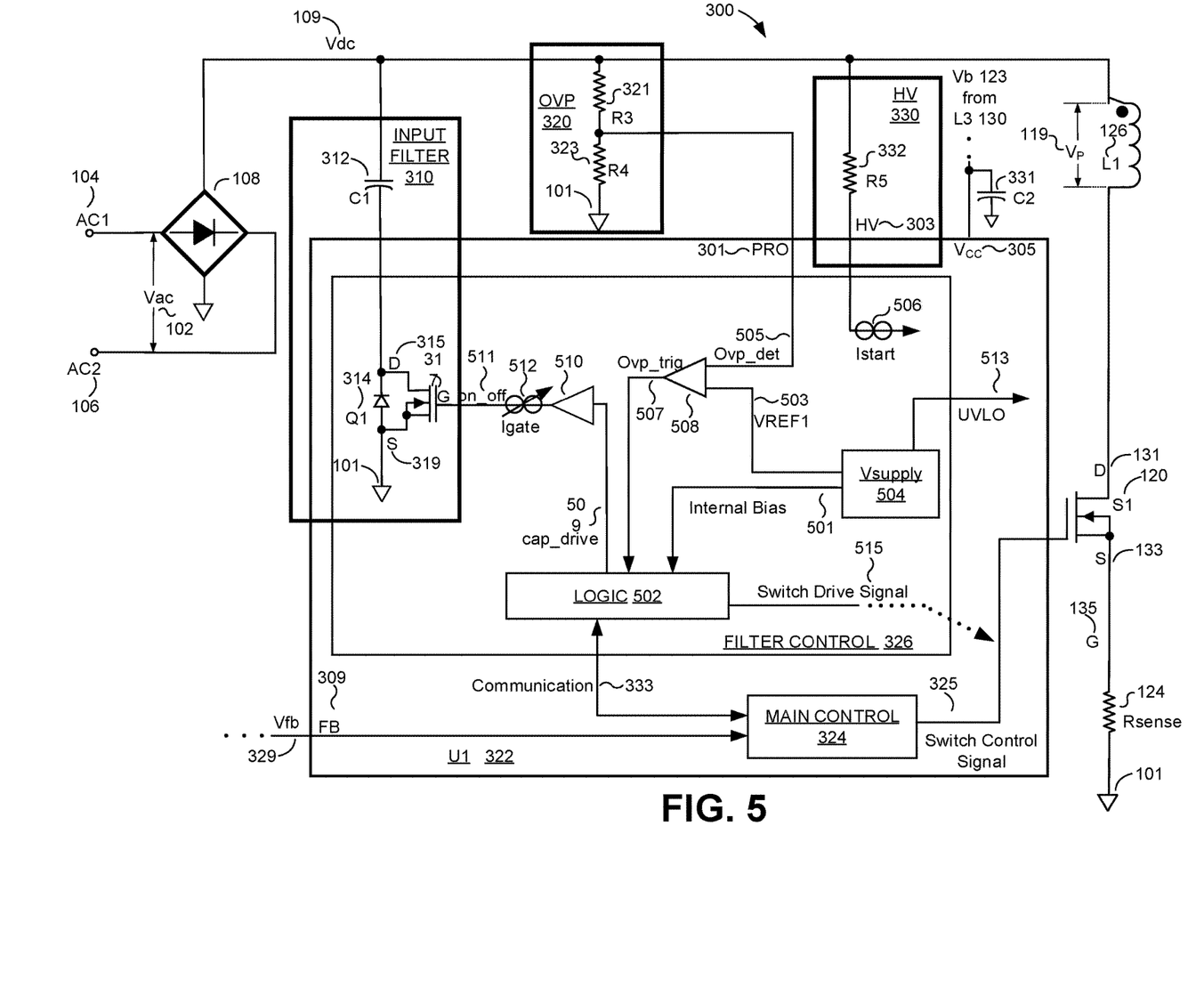
FIG. 5 is a partial diagram of the example SMPS 300 illustrating an example implementation of the filter control circuit, according to a first embodiment of the present disclosure.

FIG. 5 is a partial diagram of the SMPS 300 illustrating details of the filter control circuit 326, according to a first embodiment of the present disclosure.

As shown in FIG. 5, the filter control circuit 326 includes a logic unit 502, a voltage regulator Vsupply 504, a current source Istart 506, an overvoltage comparator 508, buffer or a driver 510, and a gate control element Igate 512, which is coupled to adjust a gate drive of the filter transistor Q1 314 to turn it on or turn it off. In one example, the gate control element 512 can be an adjustable gate drive current source or an adjustable resistance both shown as Igate 512. Also shown are signals including an internal bias signal 501 for powering the IC U1 322, a voltage reference signal Vref1 503, an overvoltage detection signal ovp_det 505, an overvoltage trigger signal ovp_trig 507, a capacitor drive signal cap_drive 509, and an on_off signal 511. All of the above signals and their couplings with various parts of the filter control circuit 326 will be explained in detail below.

As illustrated, the OVP circuit 320 is coupled to provide the overvoltage detection signal ovp_det 505 to the overvoltage (OV) comparator 508. The OV comparator 508 is further coupled to output the ovp_trig signal 507 to the logic unit 502 based on a comparison of the ovp_det signal 505 and Vref1 signal 503.

The logic unit 502 is coupled to output the cap_drive signal 509 to the buffer 510 which in turn is coupled to turn the filter transistor Q1 314 on or off. The buffer or driver 510 will buffer the cap_drive 509 signal via the gate control element 512 to control the on_off signal 511.

When capacitor 312 needs to turn off from an overvoltage event, if the Gate 317 is driven very strongly from a high current driver/buffer 510, the 312 may turn off too fast, causing a ringing whose peak amplitude is determined by parasitic inductance of the power supply, the C1 312 capacitance, the C1 312 ESR and Q1 314 Rdson, this ringing is added on top of Vdc 109 and may become too high to kill HV 303 and rest of U1 322. Hence the gate control element Igate 512 needs to be adjustable to adapt to different designs. Furthermore, Igate 512 needs to be able to turn off the capacitor C1 312 slow enough so the ringing mentioned is down to minimal, and also needs to be able to turn off the capacitor C1 312 fast enough not to affect overvoltage protection speed. This adjustable feature may be realized in hardware as fixed value in IC design, or software or any combination thereof.

It is optional for the logic unit 502 to generate the switch drive signal 515 to turn off the power switch S1 120 in response to an OV event. Referring back to the OVP circuit 320, the value of resistors R3 321 and R4 323 may be chosen per design considerations which can set or define or program an OVP trigger voltage or OVP threshold voltage via the ovp_det 505 signal which is received by the switch controller U1 322 at the input terminal PRO 301. The Vref1 503 here is the reference for over voltage threshold within filter control block 326, and may be realized in hardware as fixed value in filter control 326 block, or software or any combination thereof.

As explained earlier, in a first aspect of this disclosure, the filter control circuit 326 is configured to turn off the filter transistor Q1 314 in response to an overvoltage event. In one example the filter control circuit 326 may further turn off the power switch S1 120 by disabling the switch control signal 125. The paragraphs below explain in further details the actual working of the filter control circuit 326.

After the HV terminal 303 launches soft start of the SMPS 300, the overvoltage comparator 508 is configured to compare the ovp_det voltage 505 with the Vref1 503 and make the ovp_trig signal 507 active (high) or inactive (low). If the ovp_trig signal 507 is inactive meaning that there is no overvoltage and the SMPS 300 can be allowed to operate in a normal mode, then the logic unit 502 can enable the cap_drive signal 509 which further can turn on the filter transistor Q1 314. On the other hand, if the ovp_trig signal 507 is active, then the logic unit 502 can disable the cap_drive signal 509 which further can turn off the filter transistor Q1 314. Turning on the filter transistor Q1 314 results in connecting or coupling the filter capacitor C1 112 to the input return 101, whereas turning off the filter transistor Q1 314 results disconnecting or decoupling the filter capacitor C1 112 from the input return 101. In one example, an active ovp_trig signal 507 may be indicated by a logic high value and an inactive ovp_trig signal 507 may be indicated by a logic low value or vice versa. Moreover, when the filter transistor Q1 314 is turned on, the logic unit 502 is configured to constantly monitor the ovp_det voltage 505 via the input terminal PRO 301. At any time when an overvoltage event is detected, the logic unit 502 or speaking broadly, the filter control circuit 326 is configured to turn off the filter transistor Q1 314 via the on_off signal 511 and also optional to turn off the power switch S1 120 via the switch drive signal 515. At this time, the SMPS 300 may be considered to have changed from a normal operating mode or normal mode to an OVP mode. The filter control circuit 326 may communicate the change of mode with the main control circuit 324 via the communication signal 333; and the main control circuit may temporarily stop the normal switching operation of the power switch S1 120 until OVP is no longer detected. Or, if the main control circuit 324 still decides to turn on the power switch S1 120 in OVP mode, S1 120 may keep switching in its normal mode, but the power supply will only be able to take less than normal load due to in lack of input filter capacitors.

Once the voltage at the terminal PRO has gradually reduced to a value within a safe operating range of the SMPS 300, the logic unit 502 may allow the main control circuit 324 to resume the normal switching operation of the power switch S1 120. At this time, the SMPS 300 may be considered to have changed from the OVP mode back to the normal mode. The main control circuit 324 and the filter control circuit 326 may communicate this change of mode with each other via the communication signal 333.

By way of example, initially it may be assumed that SMPS 300 has not begun operation yet and therefore, the switch controller U1 322 is also at rest. Assuming that Vdc 109 is 400 volts, and the reference voltage Vref1 503 is 1 volt; and the designed values of R3 321 and R4 323 are such that the ratio of the two is 1/400, then the OVP threshold voltage ovp_thr will be set at 400 volts. With the above programmed values for the SMPS 300, in one example, if the Vdc 109 voltage is lower than 400 volts, then it will be considered as a normal operating mode; and if the Vdc 109 exceeds 400 volts, then that will be considered as an OVP mode. Further, in the normal mode, the overvoltage comparator 508 will make the ovp_trig signal 507 inactive which will turn on the filter transistor Q1 314. By contrast, if the Vdc 109 voltage is at 400V or higher, then the overvoltage comparator 508 will make the ovp_trig signal 507 active which will turn off the filter transistor Q1 314, thereby disconnecting the filter capacitor C1 312. It may be appreciated that the voltage regulator Vsupply 504 need not be integrated with the filter control circuit 326. It can be implemented within main control 324 as well. The Vsupply 504 powers both the filter control circuit 326, the main control circuit 324, and the entire U1 322.

The switch controller U1 322 can be an integrated circuit which may require a certain initial supply voltage and current. Described here is how to power the switch controller IC U1 322 via the HV start-up circuit 330 and Vcc 305. Initially, it may be assumed that SMPS 300 has not begun operation yet and therefore, the switch controller U1 322 is also at rest. In one example, at start-up, as the rectified dc voltage Vdc 109 at the HV terminal 303 appears, the filter control circuit 326 and main control 324 are powered up via the resistor R5 332 Upon high voltage Vdc 109 appears, the current source Istart 506 can start sourcing current from the HV terminal 303, this Istart 506 charges the Vcc capacitor C2 331 through an internal JFET of the IC (not shown) and powers up the switch controller IC U1 322. After the Vcc 305 is created from the reflected voltage on L3 130, since this value of the voltage on L3 130 is higher than the JFET output, the L3 130 will take over the power supply for U1 322 and HV 330 circuit will naturally be turned off. However, if IC U1 322 does not switch due to some other protection or if Vcc 305 does not take over the supply, then the capacitor C2 331 will be discharged by U1 322 operation, and will restart Istart 506.

As such, it may be appreciated that the HV start-up circuit 308 provides a fast start-up and helps save on standby power. The Vcc 305 supplied from L3 130 may be considered as a highly efficient housekeeping power supply for the IC U1 322 after it has started operation.

Figure 6:
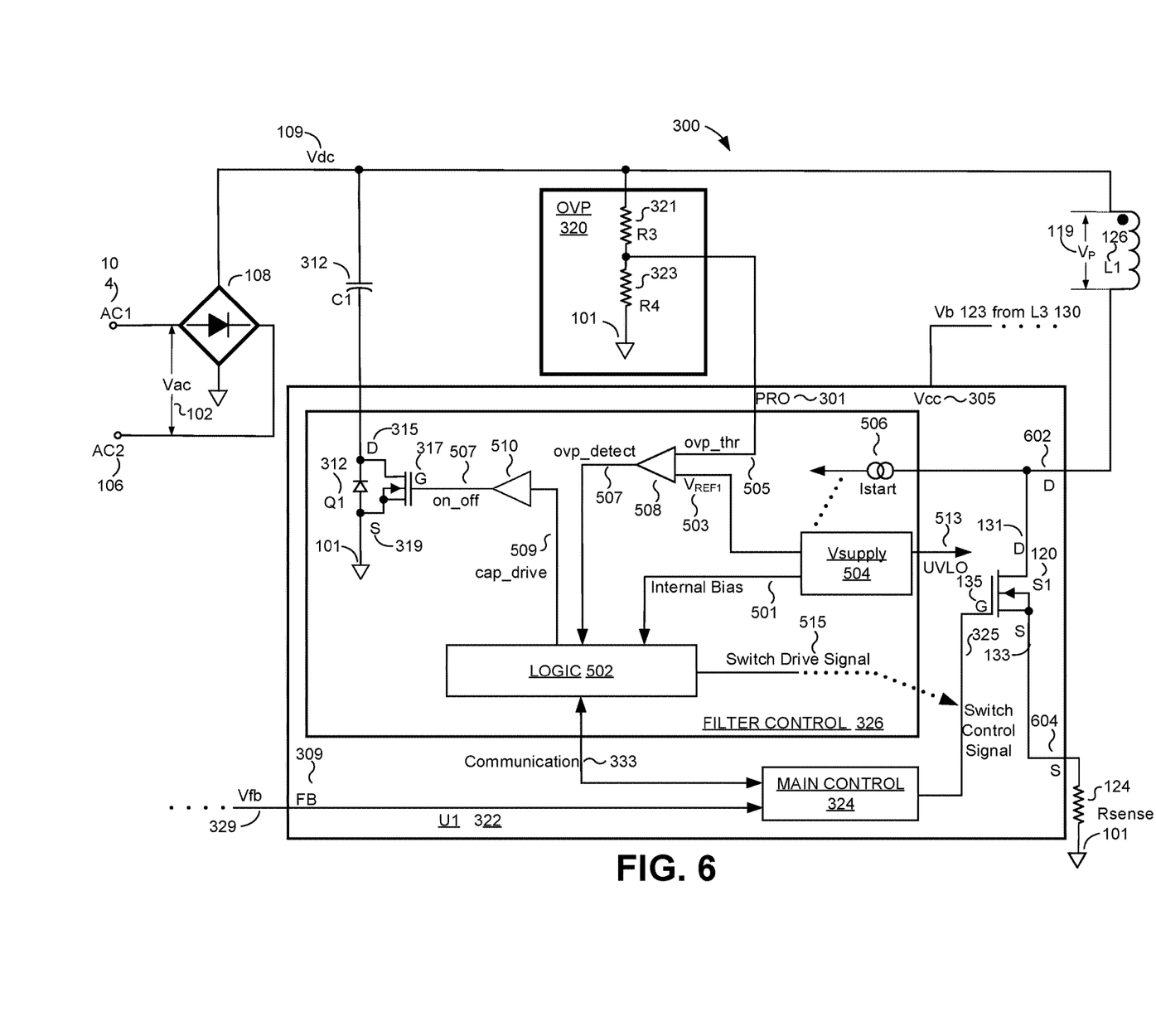
FIG. 6 is a partial diagram of the example SMPS 300 illustrating an example implementation of the filter control circuit, according to a second embodiment of the present disclosure.

FIG. 6 is a partial diagram of the SMPS 300 illustrating an example implementation of the filter control circuit 326, according to a second embodiment of the present disclosure. As can be seen, the embodiment 600 shares many common features, circuit elements, and signals with the embodiment 500 which are configured and coupled to function in a manner as explained with respect to FIG. 5. However, the embodiment 600 differs from the embodiment 500 in a couple of ways as mentioned below.

First, the power switch S1 120 is integrated with the switch controller U1 322. Since power switch S1 120 is integrated, it may be appreciated that the switch controller IC U1 322 may have additional terminals including a terminal D 602 to which the drain terminal D 131 of the power switch S1 120 is coupled, and a terminal S 604 to which the source terminal S 133 of the power switch S1 120 is coupled. Even though the power switch S1 120 is integrated in this embodiment, the detection of overvoltage on the Vdc 109 and turning on or off of the transistor Q1 314 and the power switch S1 120 happens as explained with respect to FIG. 5.

A second way in which this embodiment differs from the embodiment 500 is that there is no HV start-up circuit 308 or HV terminal 303 as shown in FIG. 5. Therefore, the initial supply voltage to power up the IC U1 322 may not take place by direct sensing of the Vdc 109. Instead, the initial supply voltage at power up is received via the primary winding L1 126 at the drain terminal D 131 of the power switch S1 120. In one example, when a rectified dc voltage Vdc 109 starts building up, substantially the same positive voltage appears at the primary winding L1 126 as Vp 119 and can be sensed via the drain terminal D 131; and the current source Istart 506 starts to source current from that. As explained with respect to FIG. 5, once the voltage Vcc 305 received via the auxiliary winding L3 130 is at least equal to Vcc_low, then that can be used to provide power to the IC U1 322. In one example, the filter control circuit 326 may include a supply voltage select mechanism to allow the D terminal 602 to provide a supply voltage to the switch controller IC U1 322 at start-up, and further allow the Vcc 305 terminal to provide power to the IC U1 322 after sensing that the IC's operating voltage Vcc 305 is at least equal to Vcc_low.

The high voltage input JFET or other type of high voltage regulator will create Istart to start the IC. In some examples, the Istart 506 may be created by a JFET (not shown) from HV 303 terminal. This JFET is internal to the IC U1 322. Basically, this JFET is a normally-on current limiting switch. Once the Vdc 109 appears, the JFET turns on in order to supply power to the IC U1 322. Since the JFET has quite a high on-resistance, it self-limits the current supplied to the IC U1 322. As such the standby power to the IC U1 322 is also limited.

Istart 506 is the internal bias 501 which supplies power to the entire IC U1 322 during initial start-up. However, when the Vcc 305 takes over the power supply from the aux winding, it provides the internal bias signal 501 instead of the Istart 506. If Vdc 109 is not high enough, or if Vcc 305 is not high enough any time during the IC operation, the IC enters UVLO mode and sends UVLO 513 signal to the main control 324, and the IC U1 322 can be restarted.

In some embodiments, the switch controller U1 122 may also include thermal monitoring unit. There may be a predefined voltage Vtmax proportional to a maximum operating temperature of the SMPS 100. The switch controller U1 122 may be configured to monitor the voltage Vt proportional to the temperature of the SMPS 100 at any given time. If any time the Vt exceeds Vtmax, the power switch S1 120 may be turned off.

It should be noted that thermal monitoring is best implemented on the main control circuit 324. It can monitor the temperature on Q1 314 or S1 120 separately.

Figure 7:
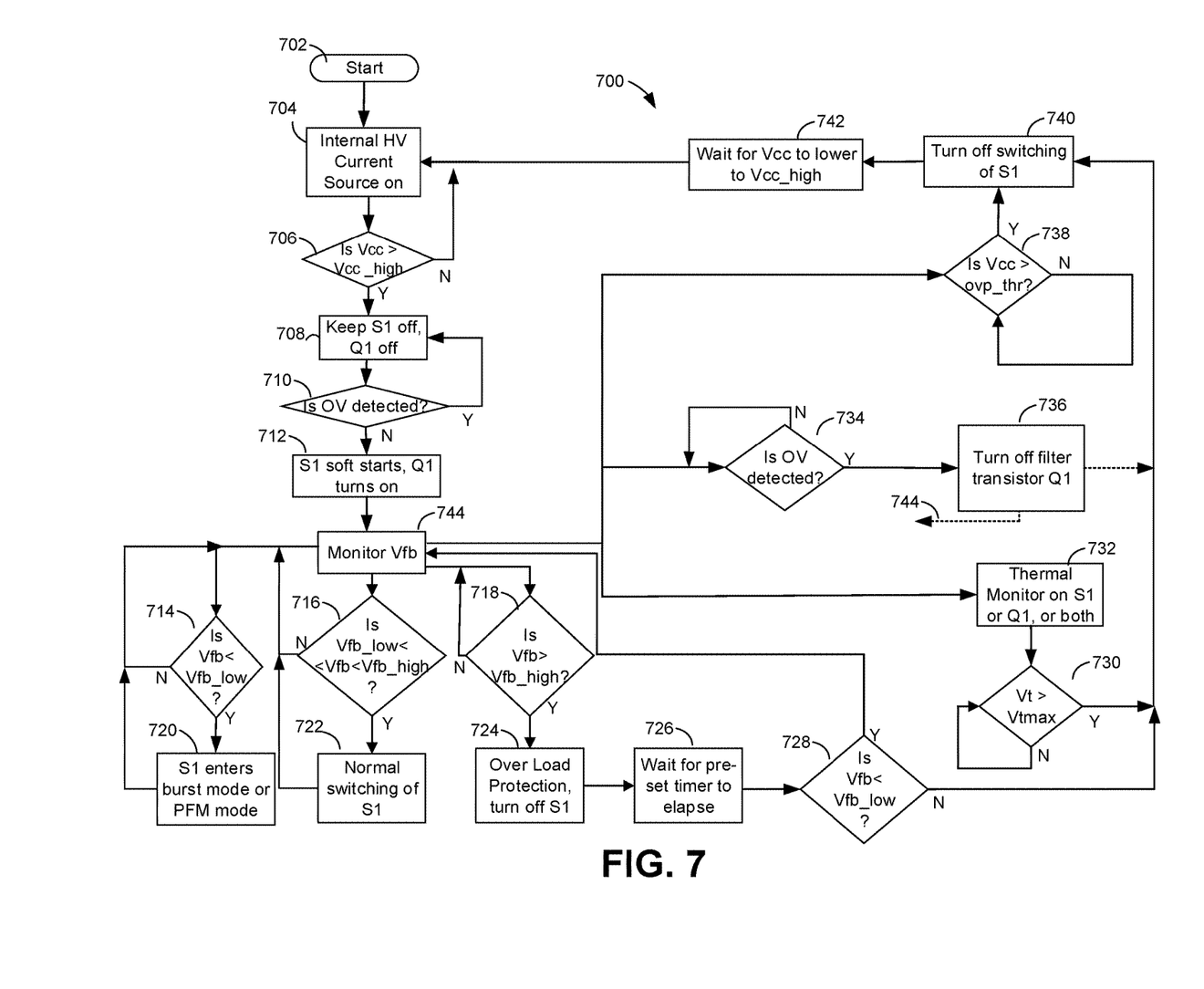
FIG. 7 is an example flow diagram 700 illustrating a method for the disclosed control circuit to control the switch controller of FIG. 1, according to an embodiment of the present disclosure.

FIG. 7 is an example flow diagram 700 illustrating a method for the disclosed filter control circuit to control the power switch S1 120 and the filter transistor Q1 314 of the SMPS 300 as shown in the embodiments of FIG. 3 or FIG. 4 or FIG. 5 or FIG. 6, according to an embodiment of the present disclosure. The flow diagram 700 includes process blocks from 700 to 744. The blocks 700, 702, 704, 706, 708, 710, 712, 714, 716, 718, 720, 722, 724, 726, 728, 744 are related to the normal mode operation of the SMPS 300, while the blocks 710, 730, 732, 734, 736, 738, 740, 742, are related to the protection modes of the SMPS 300, according to examples in this disclosure.

As can be seen, after starting at the block 702, the method proceeds to the block 704.

At the block 704, an internal current source may be turned on to provide initial supply voltage to the switch controller IC U1 322. Referring back to FIG. 5, the current source Istart 506 can start sourcing current from the terminal HV 303. Referring back to FIG. 6, the current source Istart 506 can start sourcing current from the terminal D 602. The Istart 506 will charge the Vcc capacitor through internal high voltage JFET (not shown in the figures) until Vcc builds up voltage. The method then proceeds to the block 706.

At the block 706, it may be checked if the value of Vcc 305 is higher than Vcc_high. If so then the method proceeds to the block 708. If not, then the method goes back to the block 704 where the internal current source continues to power the IC. It may be appreciated that if the condition at the block 706 is true, then it means that the aux winding L3 130 is providing power to the IC U1 322, otherwise, the aux winding L3 130 has not provided enough voltage and HV circuit 330 will continue to supply power to the IC U1 322 via the HV terminal 303.

At the block 708, the auxiliary winding L3 130 may start providing power to the IC U1 322 as explained with respect to FIG. 5. Then it proceeds to 710 to check for any overvoltage on the AC line.

At the block 710, an overvoltage check on PRO pin and comparator 508 is performed. The method then proceeds to the block 712 for a normal operating mode of the SMPS.

At the block 712, the filter transistor Q1 314 turns full on, while the main power switch S1 120 turns on following a soft start pattern—its turn-on duty cycle gradually increases. It proceeds to monitor the feedback voltage Vfb 329 at block 744 and proceeds to blocks 714, 716, and 718 simultaneously. From block 744, the method also proceeds to the block 734, 738 for the OVP mode and the block 732 for over-temperature protection simultaneously.

At the block 714, it may be checked if the Vfb 329 is lower than the Vfb_low. If so, then the SMPS enters a burst mode or reduced frequency mode of operation and method proceeds to the block 720. If not, then the method goes back to the block 744 where Vfb 329 is continuously monitored.

At the block 716, it may be checked if the Vfb 329 is between the Vfb_low and Vfb_high. If so, then the method proceeds to the block 722 to keep normal operation (fixed frequency or quasi-resonant switching or others). If not, then the method goes back to the block 744 where Vfb 329 is monitored.

At the block 718, it may be checked if Vfb 129 is higher than the Vfb_high. If so, then the power supply is under over load condition and needs to be protected. Here it proceeds to the block 724 where S1 120 can be temporarily turned off. If not, then the method goes back to the block 744 where Vfb 329 is monitored.

At the block 720, the burst mode or reduce frequency mode of operation is turned on. It proceeds to continue monitor Vfb at 744.

At the block 722, it switches at regular fixed frequency or quasi resonant or other modes. And proceeds to continue monitor Vfb At the block 724, the over load protection triggers, S1 will temporarily turn off. The method then proceeds to the block 726

At the block 726, a timer may be started. After a pre-defined time has elapsed, the method proceeds to the block 728

At the block 728, it may be checked again if Vfb 329 is lower than a safe margin Vfb_low. If it is lower, it means the overload condition is now removed, and the method goes back to the block 744 where Vfb 329 is monitored. If not, then the method decides that the overload still persists, and it proceeds to the block 740 where the switching operation of the power switch S1 120 is kept off.

At the block 734, it may be checked if OVP mode is detected. For example, referring back to FIG. 5 and FIG. 6, it may be checked whether the ovp_trig signal 507 is active or not. If so, then the method proceeds to the block 736.

At the block 736, the filter transistor Q1 314 may be turned off. The method may proceed to block 740 to lead to a turn off of S1 120 and complete restart of the power supply. The dotted line means it's an optional path. The other option is go to 744 and do nothing about S1, if the continuous operation of S1 120 during overvoltage event is desired. The selection for either path can be implemented as hardware or software or a combination At the block 740, since OVP is detected, the filter transistor Q1 314 may be turned off. The method then proceeds to the block 742, then the power supply will restart at 704

At the block 738, it may be checked if the Vcc is higher than the OVP threshold voltage ovp_thr. If so, it means the output load has some issue, and it will proceed to 740 then perform a restart on power supply. If not, then the method goes back to the beginning of the block 738 and continues to check if Vcc exceeds the OVP threshold voltage or not.

At the block 740, the power switch S1 120 is turned off. The method then goes back to the block 742

At the block 742, the Vcc may gradually decrease to Vcc_high after which the process may go back to the block 704 where internal current source is turned on again.

Additionally, at the block 732, a thermal monitor may be turned on. The method then proceeds to the block 730. At the block 732, it may be checked if the voltage of the thermal monitor (Vt) exceeds the voltage associated with the maximum operating temperature Vtmax of the SMPS 400, or a maximum temperature of S1 or Q1, or both. If not, then the method goes back to the beginning of the block 732 and continues to check if Vt exceeds Vtmax. If so, then the method proceeds to the block 740 to turn off the switching operation of the power switch S1 120.

The disclosed embodiments of the filter control circuit have been explained with respect to a switch mode power supply, it may be appreciated by those ordinary skill in the art those may be applied to other types of power supplies.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

In the above specification, the terms "power converter" and "power supply" may be used interchangeably to mean the same thing. The terms "coupled to", "configured to", "operable to" may be used interchangeably to mean the same thing. The terms "transformer" and "energy transfer element", may be used interchangeably to mean the same thing. The terms "winding" and "inductor", may be used interchangeably to mean the same thing.

What is claimed is:

1. A Switch Mode Power Supply (SMPS) comprising:
   a primary winding of a primary side coupled to receive an input voltage via an input terminal and referenced to an input return,
   an auxiliary winding coupled to the primary winding,
   a secondary winding on a secondary side coupled to provide an output voltage, an output current, and an output power to a load, and referenced to an output return,
   a power switch on the primary side,
   a switch controller comprising a main control circuit and a filter control circuit,
   a feedback circuit coupled to sense the output voltage,
   an overvoltage protection (OVP) circuit comprising a first resistor and a second resistor to generate an OVP threshold voltage signal coupled to the input terminal,
   an input filter capacitor coupled to receive the input voltage at a first terminal,
   wherein the main control circuit is configured to control the switching operation of the power switch via a switch control signal during a normal mode,
   wherein the filter control circuit is configured to connect the input filter capacitor to the input return in response to detecting a safe voltage at the input terminal,
   wherein the filter control circuit is further configured to disconnect the input filter capacitor from the input return in response to detecting an overvoltage at the input terminal, and
   wherein the filter control circuit is further configured to turn off the switching operation of the power switch via a switch drive signal in response to detecting an overvoltage at the input terminal.

2. The SMPS of claim 1, wherein the filter control circuit further comprises:
   a filter transistor coupled between the second terminal of the filter capacitor and the input return,
   a voltage regulator coupled to generate a reference voltage signal,
   an overvoltage comparator configured to compare the reference voltage signal and the OVP threshold voltage signal and to generate an overvoltage (OV) detect signal,
   a first current source,
   a logic unit coupled to compare the OV detect signal and further coupled to generate a capacitor drive signal and a switch drive signal,
   a buffer coupled to receive the capacitor drive signal,
   a gate control element coupled to receive the capacitor drive signal via the buffer and to generate an on_off signal,
   wherein the logic unit is coupled to:
     turn on the filter transistor via the on_off signal to connect the input filter capacitor to the input return when the OVP detect signal is active, and
     turn off the filter transistor via the on_off signal to disconnect the input filter capacitor from the input return when the OVP detect signal is inactive.

3. The SMPS of claim 2, wherein:
   the gate control element is a second current or a variable resistor coupled to adjust the gate drive of the filter transistor via the on_off signal.

4. The SMPS of claim 3, wherein the filter control circuit is further coupled to detect an overvoltage at the input terminal via the OVP threshold voltage,
wherein the OVP detect signal is active if the OVP threshold voltage is equal to or higher than the reference voltage, and
wherein the OVP detect signal is inactive if the OVP threshold voltage is lower than the reference voltage.

5. The SMPS of claim 2, wherein the switch controller is coupled to receive a supply voltage via the auxiliary winding, wherein the supply voltage has a low threshold value and a high threshold value.

6. The SMPS of claim 5, further comprising a high voltage (HV) start-up circuit coupled to the input terminal.

7. The SMPS of claim 6, wherein the filter control circuit is configured to provide power to the switch controller at start-up via the HV start-up circuit by turning on the current source to source current from the HV start-up circuit if the supply voltage from the auxiliary winding is equal to or lower than a high threshold value, and
wherein the logic unit is further configured to turn off the current source to source current from the HV start-up circuit if the supply voltage from the auxiliary winding is higher than the high threshold value.

8. The SMPS of claim 5, wherein the filter control circuit is configured to provide power to the switch controller at start-up via the primary winding.

9. The SMPS of claim 8, wherein the logic unit is configured to provide power to the switch controller at start-up by turning on the current source to source current from the primary winding if the supply voltage from the auxiliary winding is equal to or lower than the high threshold value, and
wherein logic unit is further configured to turn off the current source to source current from the primary winding if the supply voltage from the auxiliary winding is higher than the high threshold value.

10. The SMPS of claim 1, wherein the safe voltage is in the range of 0 volt to 400 volts and an overvoltage value is higher than 400 volts.

11. A method for a power supply comprising:
a primary winding of a primary side coupled to receive an input voltage via an input terminal and referenced to an input return,
an auxiliary winding coupled to the primary winding,
a secondary winding on a secondary side coupled to provide an output voltage, an output current, and an output power to a load, and referenced to an output return,
a power switch on the primary side,
a switch controller comprising a main control circuit and a filter control circuit,
a feedback circuit coupled to sense the output voltage,
an overvoltage protection (OVP) circuit comprising a first resistor and a second resistor,
an input filter capacitor coupled to receive the input voltage at a first terminal,
the method comprising:
controlling by the main control circuit a switching operation of the power switch via a switch control signal during a normal mode,
generating an OVP threshold voltage signal by the OVP circuit,
connecting by filter control circuit the input filter capacitor to the input return in response to detecting a safe voltage at the input terminal,
disconnecting by filter control circuit the input filter capacitor from the input return in response to detecting an overvoltage at the input terminal, and
turning off by the filter control circuit the switching operation of the power switch via a switch drive signal in response to detecting an overvoltage at the input terminal.

12. The method according to claim 11, wherein the filter control circuit further comprises:
a filter transistor coupled between the second terminal of the filter capacitor and the input return,
a voltage regulator coupled to generate a reference voltage signal,
an overvoltage comparator configured to compare the reference voltage signal and the OVP threshold voltage signal and to generate an overvoltage (OV) detect signal,
a first current source,
a logic unit coupled to receive the OV detect signal and further coupled to generate a capacitor drive signal and a switch drive signal,
a buffer coupled to receive the capacitor drive signal and to generate an on_off signal,
a gate control element coupled to receive the capacitor drive signal via the buffer and to generate an on_off signal,
the method further comprising:
turning on the filter transistor via the on_off signal to connect the input filter capacitor to the input return when the OVP detect signal is active, and
turning off the filter transistor via the on_off signal to disconnect the input filter capacitor from the input return when the OVP detect signal is inactive.

13. The method according to claim 12, wherein:
the gate control element is a second current or a variable resistor coupled to adjust the gate drive of the filter transistor via the on_off signal,
the method further comprising:
turning on and turning off the filter transistor by adjusting its gate drive via the on_off signal.

14. The method according to claim 11, further comprising:
detecting by the filter control circuit an overvoltage at the input terminal in response to sensing the OVP threshold voltage.

15. The method according to claim 14, further comprising:
making the OVP detect signal active if the OVP threshold voltage is equal to or higher than the reference voltage, and
making the OVP detect signal inactive if the OVP threshold voltage is lower than the reference voltage.

16. The method according to claim 15, further comprising:
a high voltage (HV) start-up circuit coupled to the input terminal.

17. The method according to claim 16, further comprising:
providing power to the switch controller at start-up by turning on the current source to source current from the HV start-up circuit if the supply voltage from the auxiliary winding is equal to or lower than a high threshold value, and
further turning off the current source to source current from the HV start-up circuit if the supply voltage from the auxiliary winding is higher than the high threshold value.

18. The method according to claim 15, wherein the filter control circuit is configured to provide power to the switch controller at start-up via the primary winding.

19. The method according to claim 18, further comprising:
providing power to the switch controller at start-up by turning on the current source to source current from the primary winding if the supply voltage from the auxiliary winding is equal to or lower than the high threshold value, and
further turning off the current source to source current from the primary winding if the supply voltage from the auxiliary winding is higher than the high threshold value.

20. The method according to claim 11, wherein the safe voltage is in the range of 0 volt to 400 volts and an overvoltage value is higher than 400 volts.

* * * * *